United States Patent
Bates et al.

(10) Patent No.: US 8,972,957 B2
(45) Date of Patent: *Mar. 3, 2015

(54) THERMAL-AWARE SOURCE CODE COMPILATION

(71) Applicant: International Business Machines Corporation, Armonk, NY (US)

(72) Inventors: Cary L. Bates, Rochester, MN (US); Nicholas P. Johnson, Rochester, MN (US); Justin K. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/711,236

(22) Filed: Dec. 11, 2012

(65) Prior Publication Data

US 2013/0104110 A1    Apr. 25, 2013

Related U.S. Application Data

(63) Continuation of application No. 13/210,539, filed on Aug. 16, 2011.

(51) Int. Cl.
  *G06F 9/45* (2006.01)
  *G06F 9/50* (2006.01)
  (Continued)

(52) U.S. Cl.
  CPC .......... *G06F 8/41* (2013.01); *G06F 9/5016* (2013.01); *G06F 9/44* (2013.01); *G06F 8/443* (2013.01); *G06F 11/002* (2013.01)
  USPC ......................................................... 717/140

(58) Field of Classification Search
  CPC .............. G06F 8/41; G06F 8/61; G06F 8/65; G06F 8/67; G06F 8/71; G06F 8/443; G06F 8/447; G06F 9/45516; G06F 8/68

USPC .................................................. 717/140, 169
See application file for complete search history.

(56) References Cited

U.S. PATENT DOCUMENTS 5,502,838 A * 3/1996 Kikinis .......................... 713/501
7,191,088 B1    3/2007 Reed et al.
(Continued)

OTHER PUBLICATIONS

Damavandpeyma et al., "Thermal-Aware Scratchpad Memory Design and Allocation," 2010 IEEE International Conference on Computer Design (ICCD), Oct. 3, 2010, pp. 1-7.*

(Continued)

*Primary Examiner* — Wei Zhen
*Assistant Examiner* — Andrew M Lyons
(74) *Attorney, Agent, or Firm* — Biggers Kennedy Lenart Spraggins, LLP (57) ABSTRACT

Thermal-aware source code compilation including: receiving, by a compiler, an identification of a target computing system, the identification of the target computing system specifying temperature sensors that measure temperature of a memory module; compiling the source code into an executable application including inserting in the executable application computer program instructions for thermal-aware execution, the computer program instructions, when executed on the target computing system, carry out the steps of: retrieving temperature measurements of one or more of the target computing system's temperature sensors; determining, in real-time in dependence upon the temperature measurements, whether a memory module is overheated; if a memory module is overheated, entering a thermal-aware execution state including, for each memory allocation in the executable application, allocating memory on a different memory module than the overheated memory module; and upon the temperature sensors indicating the memory module is no longer overheated, exiting the thermal-aware execution state.

7 Claims, 4 Drawing Sheets

(51) Int. Cl.
  *G06F 9/44* (2006.01)
  *G06F 11/00* (2006.01)

(56) References Cited

U.S. PATENT DOCUMENTS

| | | | |
|---|---|---|---|
| 7,249,211 B2* | 7/2007 | Wieland et al. | 710/269 |
| 7,360,102 B2* | 4/2008 | Inoue | 713/300 |
| 2007/0257359 A1 | 11/2007 | Reis et al. | |
| 2013/0047142 A1 | 2/2013 | Bates et al. | |

OTHER PUBLICATIONS

Yang et al., "Processor Reliability Enhancement through Compiler-Directed Register File Peak Temperature Reduction," IEEE/IFIP International Conference on Dependable Systems & Networks, 2009.*

Basten et al., "Thermal-Aware Scratchpad Memory Design and Allocation," *2010 IEEE International Conference on Computer Design (ICCD)*, Oct. 3, 2010, pp. 1-7, Digital Object Identifier: 10.1109/ICCD.2010.5647616, The Netherlands.

Kim et al.; "Temperature-Aware Compilation for VLIW Processors," *13th IEEE Conference on Embedded and Real-time Computing Systems and Applications (RTCSA 2007)*, pp. 426-431, Aug. 2007, Korea.

Atienza et al., "Thermal-Aware Data Flow Analysis," *Design Automation Conference, 2009 (DAC '09. 46th ACM/IEEE*, Jul. 2009, pp. 613-614, San Francisco, California, USA.

Atienza et al., "Thermal-Aware Compilation for System-On-Chip Processing Architectures," *Proceedings of the 20th Symposium on Great Lakes Symposium on VLSI*, Digital Object Identifier: 10.1145/1785481.1785535, May 2010, pp. 221-226, Providence, Rhode Island, USA.

Orailoglu et al., "Processor Reliability Enhancement Through Compiler-Directed Register File Peak Temperature Reduction," *IEEE/IFIP International Conference on Dependable Systems & Networks, 2009. DSN '09*, Digital Object Identifier: 10.1109/DSN.2009.5270305, Jun. 2009, pp. 468-477, Portugal.

David et al., "Thermal Modeling and Management of DRAM Memory Systems," *ISCA '07 Proceedings of the 34th Annual International Symposium on Computer Architecture*, Digital Object Identifier: 10.1145/1273440.1250701, May 2007, pp. 312-322, New York, USA.

Liu et al., "A Power and Temperature Aware DRAM Architecture," *DAC '08 Proceedings of the 45th annual Design Automation Conference*, Digital Object identifier: 10.1145/1391469.1391691, Jun. 2008, pp. 1-6, New York, USA.

David, "Software Thermal Management of DRAM Memory for Multicore Systems," *SIGMETRICS '08 Proceedings of the 2008 ACM SIGMETRICS International Conference on Measurement and Modeling of Computer Systems*, Digital Object Identifier: 10.1145/1375457.1375496, Jun. 2008 pp. 337-348, New York, USA.

Damavandpeyma et al., "Thermal-Aware Scratchpad Memory Design and Allocation", 2010 IEEE International Conference on Computer Design (ICCD), Oct. 3, 2010, pp. 1-7, IEEE, USA.

Yang et al., "Processor Reliability Enhancement through Compiler-Directed Register File Peak Temperature Reduction", 2009 IEEE/IFIP International Conference on Dependable Systems & Networks, Jun. 29, 2009, pp. 468-477, IEEE, USA.

Office Action, U.S. Appl. No. 13/210,539, Feb. 15, 2013, 1-18.
Final Office Action, U.S. Appl. No. 13/210,539, Aug. 2, 2013, 1-15.

* cited by examiner

THERMAL-AWARE SOURCE CODE COMPILATION

CROSS-REFERENCE TO RELATED APPLICATION

This application is a continuation application of and claims priority from U.S. patent application Ser. No. 13/210,539, filed on Aug. 16, 2011.

BACKGROUND OF THE INVENTION

1. Field of the Invention

The field of the invention is data processing, or, more specifically, methods, apparatus, and products for thermal-aware source code compilation.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

During operation of a computer, memory modules such as Dual In-line Memory Modules (DIMMs), may generate a large amount of heat. Heat generation may cause degradation and eventually failure of DIMMs over time. Current program execution may create a disproportionate distribution of heat generation among many DIMMs or even among modules of one DIMM. That is, in a memory system that includes a number of DIMMs, a subset of the DIMMs may be accessed many more times than other DIMMs in the system. This disproportionate accessing may cause the subset of DIMMs to generate far more heat over time than other DIMMs. Such disproportionate heat generation may effect degradation of the subset of DIMMs more quickly than the other DIMMs in the system. That is, the operating life of each DIMM in the subset of DIMMs that is accessed more frequently is consumed much more quickly than the operating life of each of the other DIMMs. It would be useful, therefore, to distribute heat generation in a more balanced, even manner amongst all DIMMs in a subsystem.

SUMMARY OF THE INVENTION

Methods, apparatus, and products for thermal-aware source code compilation are described in this specification. Such thermal-aware source code compilation includes receiving, by a compiler during compilation of source code, an identification of a target computing system for which the source code is to be compiled. The identification of the target computing system specifies a number of temperature sensors, with each temperature sensor configured to measure temperature of a memory module of the target computing system. The compiler compiles the source code into an executable application and inserts in the executable application computer program instructions for thermal-aware execution. The computer program instructions, when executed on the target computing system, carry out the steps of: retrieving temperature measurements of one or more of the target computing system's temperature sensors; determining, in real-time in dependence upon the temperature measurements, whether a memory module is overheated; if a memory module is overheated, entering a thermal-aware execution state including, for each memory allocation in the executable application, allocating memory on a different memory module than the overheated memory module; and upon the temperature sensors indicating the memory module is no longer overheated, exiting the thermal-aware execution state.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
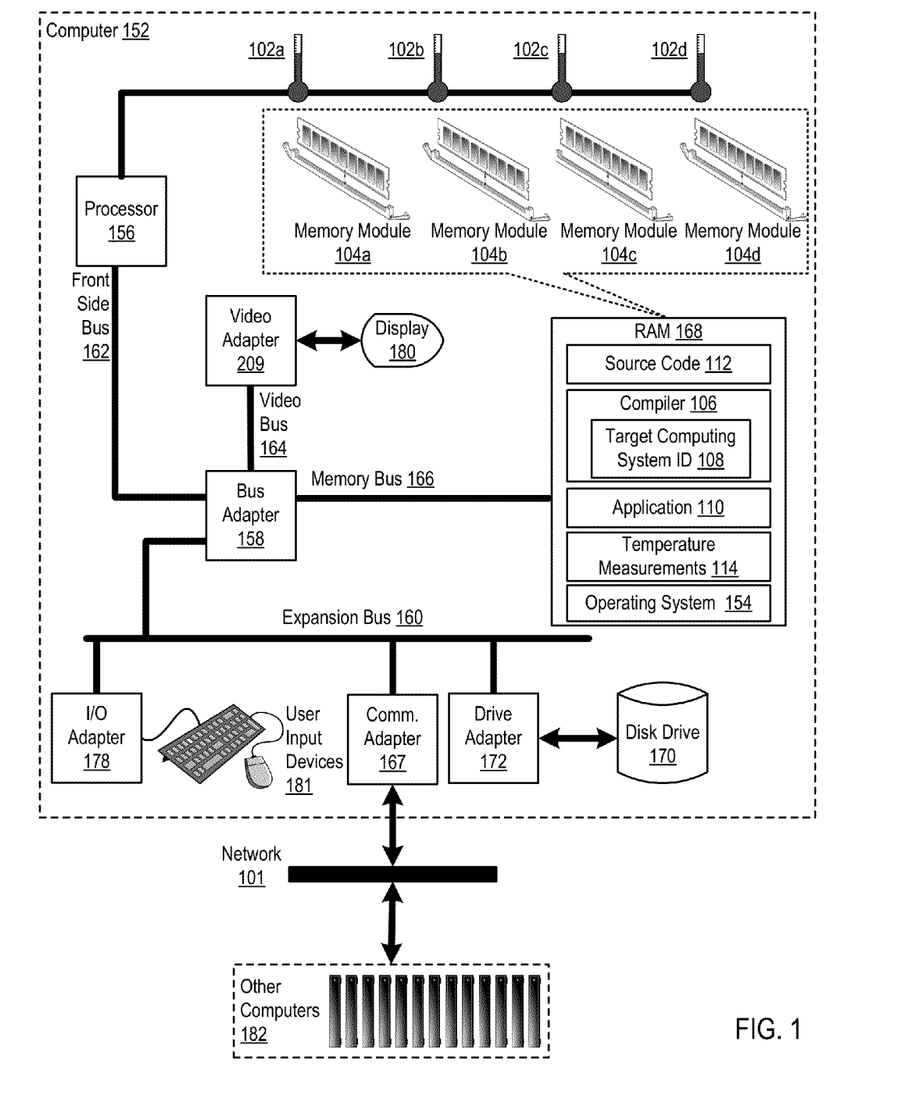
FIG. 1 sets forth a block of a system for thermal-aware source code compilation according to embodiments of the present invention.

Exemplary methods, apparatus, and products for thermal-aware source code compilation in accordance with the present invention are described with reference to the accompanying drawings, beginning with FIG. 1. FIG. 1 sets forth a block of a system for thermal-aware source code compilation according to embodiments of the present invention. The system of FIG. 1 includes a includes an exemplary computer (152) that, in turn, includes at least one computer processor (156) or 'CPU' as well as random access memory (168) ('RAM') which is connected through a high speed memory bus (166) and bus adapter (158) to processor (156) and to other components of the computer (152).

In the example computer (152) of FIG. 1, RAM (168) includes several memory modules. The term 'memory module' as used in this specification refers to any unit of computer memory. Examples of a unit of computer memory include: a Dual In-Line Memory Module ('DIMM'); a rank of a DIMM; and a Dynamic Random Access Memory ('DRAM') integrated circuit of a DIMM. In the example of FIG. 1, the computer memory is implemented with four Dual In-line Memory Modules (DIMMs) (104a, 104b, 104c, 104d). Each DIMM may be considered a separate memory module. Alternatively, each integrated circuit of computer memory on the DIMM itself may be considered a separate memory module. For ease of explanation—not limitation—each DIMM (104a-104d) in the example of FIG. 1 is referred to as a separate memory module.

In the example of FIG. 1, a separate temperature sensor (102a, 102b, 102c, 102d) is associated with each DIMM (104a-104d) in that each temperature sensor measures the temperature of one DIMM. Temperature sensors are depicted in the example of FIG. 1 as components separate from the DIMMs themselves, but readers of skill in the art will recognize that such temperature sensors may be implemented in a variety of manners—on a motherboard, in or near a DIMM slot of the motherboard, on the DIMM itself, and so on. Each such implementation is well within the scope of the present invention.

The temperature sensors (102a-102d) are coupled to the processor (156) in the example of FIG. 1. In such an embodiment, the temperature sensor may store a present temperature of a memory module in a designated, well known processor register periodically or upon request, or may raise an interrupt or flag when the temperature of a memory module exceeds a predetermined threshold. The temperature sensors (102a-102d) are depicted in the example of FIG. 1 as being coupled to the processor (156) for clarity of explanation, not limitation. Readers of skill in the art will recognize that temperature sensors (102a-102d) capable of measuring temperature of a memory module may be operatively coupled in a variety of ways. For example, temperature sensors may be coupled to an expansion bus (160) through an Input/Output (I/O) adapter (178), coupled to a service processor (not shown) through an out-of-band bus, or in other ways as will occur to readers of skill in the art.

Stored in RAM (168) is a compiler (106), a module of computer program instructions that transforms source code written in a programming language (the source language) into another computer language (the target language, often having a binary form known as object code). The most common task executed by a compiler is transformation of source code into an executable application.

In the example of FIG. 1, the compiler (106) is also configured to support thermal-aware source code compilation in accordance with embodiments of the present invention. The compiler (106) carries out thermal-aware source code compilation by receiving, during compilation of source code (112), an identification (108) of a target computing system for which the source code is to be compiled. In the example of FIG. 1, the compiler (106) receives an identification (108) of computer (152) as the target computing system. That is, the compiler in the example of FIG. 1 is configured to compile the source code (112) into an application, executable on the computer (152).

Identifications (108) of target systems may specify various attributes of the target computing system needed by the compiler to compile high-level programming language source code into computer program instructions executable on the target computing system. For example, an identification (108) of a target computing system may specify a processor type or instruction set architecture—x86, IBM's Power Architecture, RISC (reduced instruction set computer), and so on as will occur to readers of skill in the art. An identification (108) of a target computing system may also include a more detailed description of a target computing system, specifying components of memory subsystems, adapters, and other computing hardware components. In the example of FIG. 1, the identification (108) of the target computing system specifies, in addition to memory modules of the computer (152), a number of temperature sensors, where each temperature sensor is configured to measure temperature of a memory module (104a-104d) of the target computing system (152).

In the example of FIG. 1, after receiving an identification of a target computing system for which the compiler is to compile the source code, the compiler (106) proceeds with thermal-aware source code compilation by compiling the source code (112) into an executable application (110) in dependence upon the identification (108). As part of compiling the source code, the compiler (106) inserts in the executable application (110) computer program instructions for thermal-aware execution.

The application's (110) computer program instructions for thermal-aware execution, when executed on the target computing system, carry out the steps of: retrieving temperature measurements (114) of one or more of the target computing system's temperature sensors (102a-102d) and determining, in real-time in dependence upon the temperature measurements, whether a memory module (104a-104d) is overheated. The determination of whether one of the memory modules is overheated is said to be carried out "in real time" in that the determination is made by the application during normal execution of the application—without user interaction. That is, no user request is required for the application to determine whether a memory module in the target computing system (152) is overheated.

If a memory module (104a-104d) is overheated, the application (110) enters a thermal-aware execution state. The term "thermal-aware execution state" as used in this specification is a state in which the application (110), during execution of its primary tasks, executes one or more additional tasks—typically unbeknownst to a user—to manage thermal distribution among the memory modules (104a-104d) in the target computing system (152). By contrast, in a normal execution state, an application (110) carries out its primary tasks without any attempt to manage thermal distribution in the target computing system. The effect of the thermal-aware execution state is two-fold: first, from a user's perspective, the application (110) executes in a normal fashion, carrying out all data processing tasks that the application (110) would carry out in a normal execution state; and second, the application (110) without the user's direct involvement manages thermal distribution in the memory subsystem. In the example of FIG. 1, the application (110) operates in a thermal-aware execution state by allocating, for each memory allocation in the executable application, memory on a different memory module than the overheated memory module. Typical memory allocation occurs by requesting, by the application of the operating system (154), memory of a particular size to be allocated for use by the application.

In the prior art, memory allocation occurs without any knowledge, from the perspective of the requesting application, regarding the memory module—the physical components—upon which the memory is to be allocated. In most instances, operating systems (154) are configured to allocate memory or a particular application in a contiguous fashion. Consider, as explanatory example, a first memory region of 100 Megabytes (MB) allocated to an application. When the same application requests another memory allocation, of 150 MB, the operating system will allocate the next available 150 MB. If no other memory allocation has occurred since the 100 MB memory region was allocated to the application, the operating system will allocate the 150 MB following the 100 MB to the application. In many cases, then, subsequent memory allocations are carried out with memory on the same memory module—same DIMM, for example. Once allocated, a memory region may be accessed any number of times by the application that requested the allocation. Each access generates an amount of heat in the memory module upon which the accessed memory region exists.

In the example of FIG. 1, the application (110)—operating in a thermal-aware execution state—allocates memory on a memory module (104a-104d) other than the overheated memory module. In this way, the subsequent accesses to the newly allocated memory region are directed to a memory module that is not overheated, effectively reducing the number of accesses directed to—and heat generated in—the overheated memory module.

Upon the temperature sensors (102a-102d) indicating the memory module is no longer overheated, the application (110) exits the thermal-aware execution state. That is, after the temperature of the overheated memory module drops below a predetermined threshold, the application (110) will operate in a normal manner, allocating memory without regard to the memory module from which the memory is to be allocated.

Also stored in RAM (168) is an operating system (154). Examples of operating systems that support thermal-aware source code compilation according to embodiments of the present invention include UNIX™, Linux™, Microsoft XP™, AIX™, IBM's i5/OS™, and others as will occur to those of skill in the art. The operating system (154), user-level application (110), and compiler (106) example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers that support thermal-aware source code compilation according to embodiments of the present invention include Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (101). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers that support thermal-aware source code compilation according to embodiments of the present invention include modems for wired dial-up communications, Ethernet (IEEE 802.3) adapters for wired data communications, and 802.11 adapters for wireless data communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
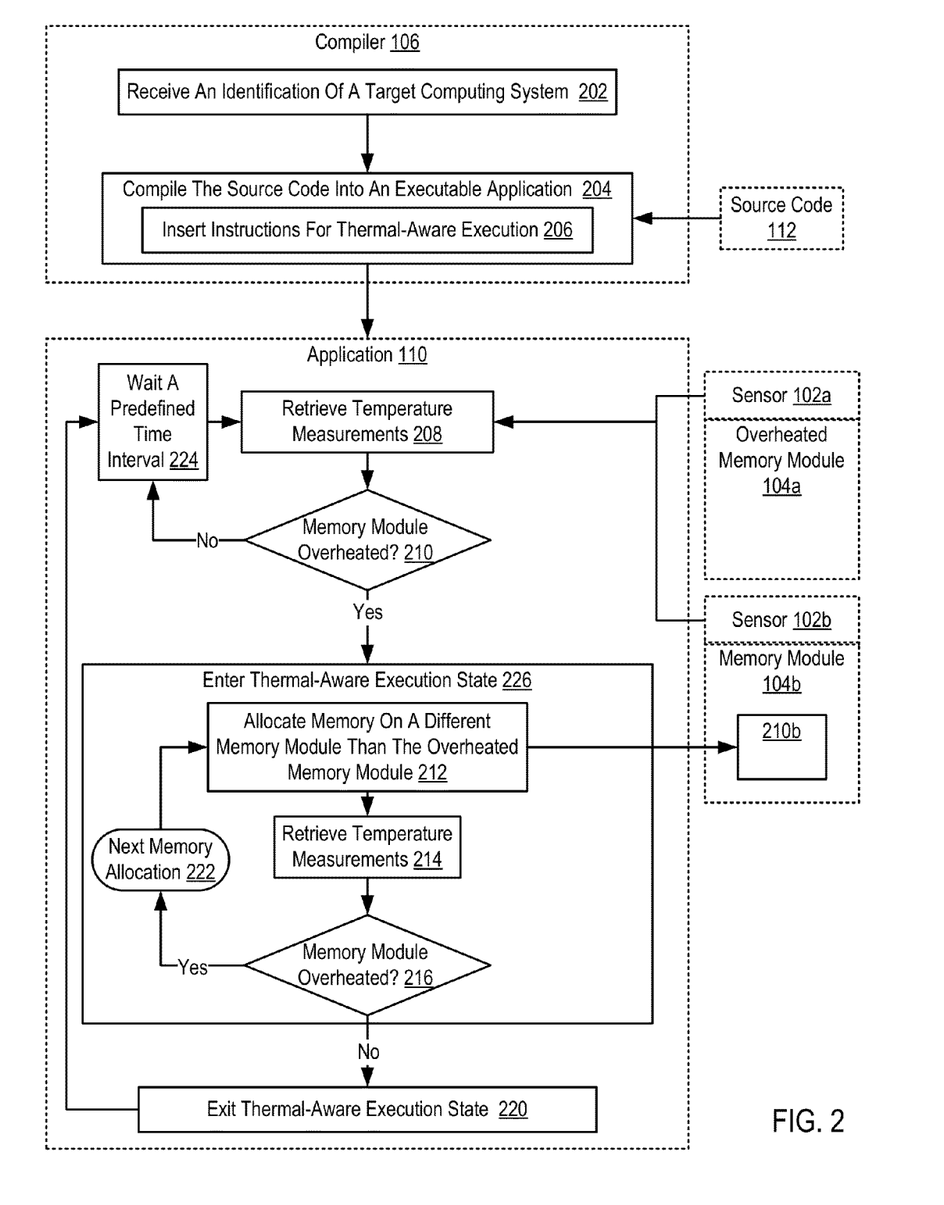
FIG. 2 sets forth a flow chart illustrating an exemplary method for thermal-aware source code compilation according to embodiments of the present invention.

For further explanation, FIG. 2 sets forth a flow chart illustrating an exemplary method for thermal-aware source code compilation according to embodiments of the present invention. The method of FIG. 2 includes receiving (202), by a compiler (106) during compilation of source code, an identification of a target computing system for which the source code is to be compiled. In the example of FIG. 2, the identification of the target computing system specifies a number of temperature sensors in the computer memory subsystem of the target computing system. Each temperature sensor is configured to measure temperature of a memory module of the target computing system. Receiving (202) an identification of a target computing system for which the source code is to be compiled may be carried out in various ways including receiving a configuration file corresponding to the target computing system, receiving the identification from a user through a selection of one or more graphical user interface options, receiving the identification responsive to a request to a web server hosting target computing system identifications, generating the identification by inspecting the computing system upon which the compiler is executing, and so on as will occur to readers of skill in the art.

The method of FIG. 2 also includes compiling (204) the source code (112) into an executable application (110). In the method of FIG. 2, compiling (204) the source code (112) includes inserting (206) in the executable application (110) computer program instructions for thermal-aware execution. The compiler (106) may insert computer program instructions for thermal-aware execution by inserting machine executable instructions at predefined locations—prior to function calls, immediately following returns from function calls, prior to iterative loops, just after iterative loops, and so on.

The computer program instructions inserted into the application (110) for thermal-aware application cause the application (110) to carry out the remaining steps in the example method of FIG. 2. That is, the method of FIG. 2 includes retrieving (208) temperature measurements of one or more of the target computing system's temperature sensors (102a, 102b). Retrieving (208) temperature measurements of one or more of the target computing system's temperature sensors (102a, 102b) may be carried out in various ways depending on the implementation of the temperature sensors. In embodiments in which the temperature sensors (102a, 102b) are configured to interrupt the processor when a memory module's temperature exceeds a threshold, the application (110) may retrieve temperature measures by providing an interrupt handler that identifies the memory module responsive to such an interrupt. In embodiments in which each temperature sensor periodically stores a present temperature of a memory module, the user-level application (110) may retrieve the contents of that register periodically and determine whether the value stored in the register is greater than a predefined threshold. Readers of skill in the art will recognize that these are but two ways among many possible ways to retrieve (208) temperature measurements of temperature sensors.

The method of FIG. 2 continues by determining (210), in real-time in dependence upon the temperature measurements, whether a memory module is overheated. Determining (210) whether a memory module is overheated may be carried out in various ways. For example, determining whether a memory module is overheated may be carried out by determining, for each temperature measurement, whether the measured temperature of a memory module is greater than a predetermined threshold temperature.

If no memory module is overheated, the method of FIG. 2 continues by waiting (224) a predefined period of time and again retrieving (208) temperature measurements followed by a determination (210) of whether a memory module is overheated. That is, in the method of FIG. 2, retrieving (208) temperature measurements of one or more of the target computing system's temperature sensors is carried out periodically at a predefined interval of time. The predefined interval of time may be specified in various ways and need not be limited to minutes and seconds. Instead, the interval may be specified as a number of executed instructions, a number of execution subroutines, a number of function calls, a number of returns from a subroutine, and so on as will occur to readers of skill in the art. Although FIG. 2 depicts retrieving (208) and determining (210) being carried out in a periodic fashion, such retrieving and determination may be carried out asynchronously responsive to interrupts raised when a memory module's temperature exceeds a predetermined threshold.

If a memory module is overheated, the method of FIG. 2 continues by entering (226) a thermal-aware execution state. Entering the thermal-aware execution state in the method of FIG. 2 includes, allocating (212), for each memory allocation in the executable application, memory on a different memory module than the overheated memory module. In the thermal-aware execution state (210), the application allocates (212) memory on a different memory module, then prior to the next memory allocation (222), retrieves temperature measurements (214) and determines (216) whether the overheated memory module (104a) remains overheated. If the overheated memory module (104a) remains overheated, the next memory allocation (222) will be allocated (212) to a memory module other than the overheated memory module. That is, the application remains in the thermal aware execution state. If, however, the overheated memory module (104a) is no longer overheated—that is, upon the temperature sensors indicating the memory module is no longer overheated—the application (110) exits (220) the thermal-aware execution state. Subsequent memory allocations will be carried out with regard to the memory module from which the memory is allocated.

Figure 3:
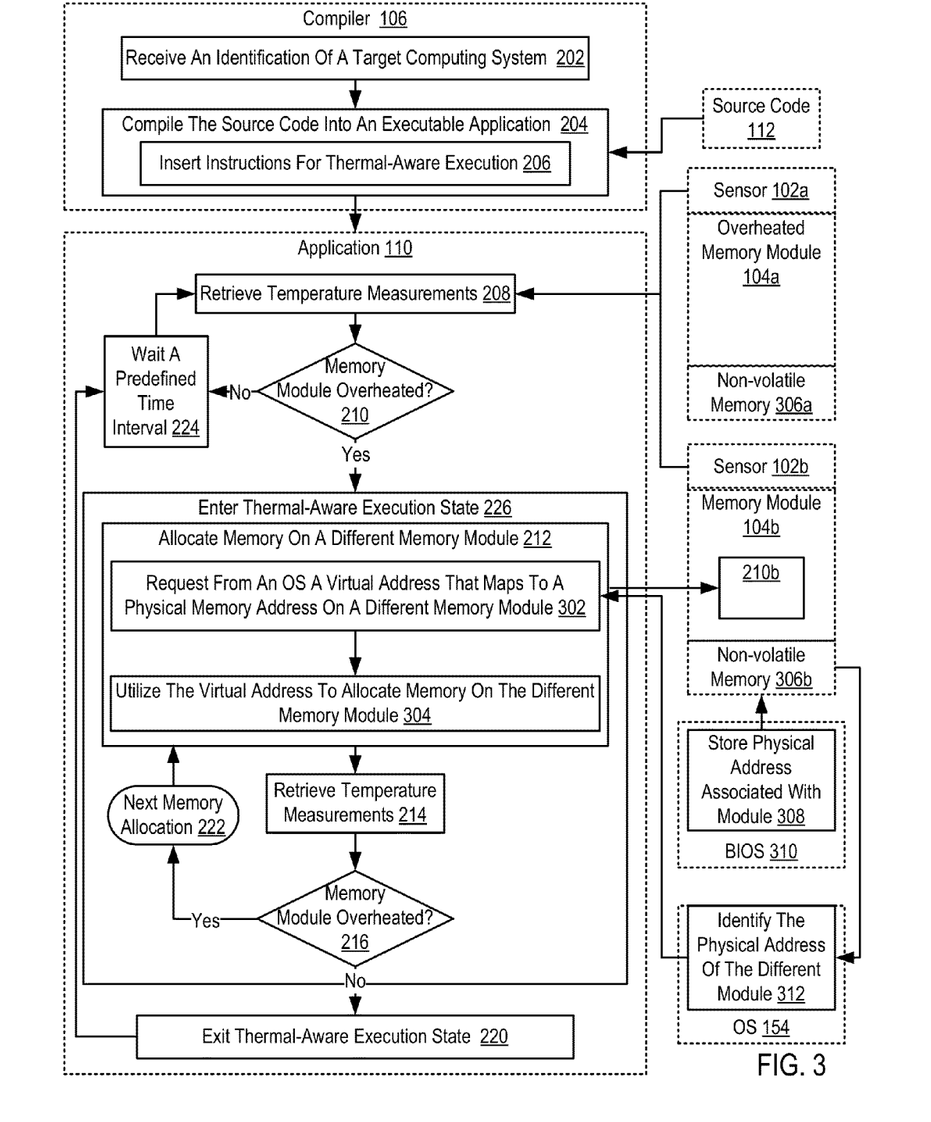
FIG. 3 sets forth a flow chart illustrating an exemplary method for thermal-aware source code compilation according to embodiments of the present invention.

For further explanation, FIG. 3 sets forth a flow chart illustrating an exemplary method for thermal-aware source code compilation according to embodiments of the present invention. The method of FIG. 3 is similar to the method of FIG. 2, including as it does: receiving (202) an identification of a target computing system; compiling (204) the source code into an executable application; retrieving (208) temperature measurements; determining (210) whether a memory module is overheated; if a memory module is overheated, entering (226) a thermal-aware execution state including, for each memory allocation in the executable application, allocating (212) memory on a different memory module than the overheated memory module; and upon the temperature sensors indicating the memory module is no longer overheated, exiting (220) the thermal-aware execution state.

The method of FIG. 3 differs from the method of FIG. 2, however, in that the method of FIG. 3 includes storing (308) by a Basic Input/Output Services (310) module, in non-volatile memory (306a, 306b) of each memory module (104a, 104b) of the target system upon startup of the target system a physical memory address associated with the memory module. In a computer memory subsystem including multiple memory modules, such as two DIMMs, each memory module represents a range of separate physical addresses. In the example of FIG. 3, BIOS (310) stores at boot time an identification of each memory module's associated physical address range. In this way, a module may inspect the contents of a memory module's non-volatile memory (306) to identify a physical address on that memory module. Readers of skill in the art will recognize that such storage of physical address to memory module associations need not be carried out only by a BIOS module. Instead, any firmware, software, operating system or operating system component, may store such associations in the non-volatile memory of the memory modules (104a, 104b).

Also in the method of FIG. 3, when the application enters (226) a thermal aware execution state, allocating (212) memory on a different memory module than the overheated memory module includes requesting (302) from an operating system (154) of target computing system, a virtual address that maps to a physical memory address on a different memory module other than the overheated memory module. Such a request (302) may be a call to an operating system function that includes as a parameter passed to the function a memory module identifier.

Applications are typically unaware of the physical address space allocated to the application. Instead, the application is aware of only its virtual address space, provided to the application and managed by the operating system. The operating system (154) in the example of FIG. 3 is configured to receive the request for a virtual address that maps to a physical address of a different memory module. Responsive to that request the operating system identifies (312) a physical memory address of the different memory module from the associations stored in the different memory module's non-volatile memory (306a, 306b).

IN the method of FIG. 3, the application (110) receives, as a response to the request (302), the virtual address that maps to a physical address on another memory module (104b) and utilizes (304) the virtual address to allocate memory on the different memory module. Such an allocation may be carried out with a call to an operating system function having as parameters passed to the function, the virtual address received from the operating system and an offset specifying the size of the memory region to allocate beginning at the virtual address.

Figure 4:
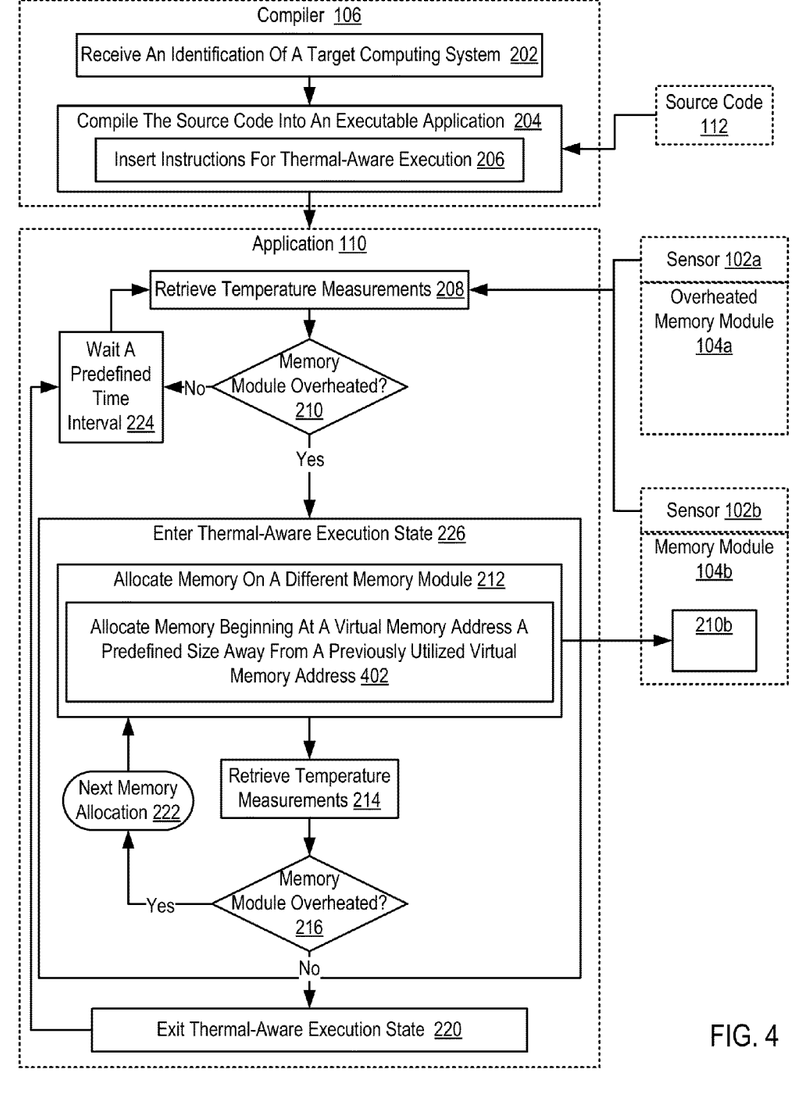
FIG. 4 sets forth a flow chart illustrating an exemplary method for thermal-aware source code compilation according to embodiments of the present invention.

For further explanation, FIG. 4 sets forth a flow chart illustrating an exemplary method for thermal-aware source code compilation according to embodiments of the present invention. The method of FIG. 4 is similar to the method of FIG. 2, including as it does: receiving (202) an identification of a target computing system; compiling (204) the source code into an executable application; retrieving (208) temperature measurements; determining (210) whether a memory module is overheated; if a memory module is overheated, entering (226) a thermal-aware execution state including, for each memory allocation in the executable application, allocating (212) memory on a different memory module than the overheated memory module; and upon the temperature sensors indicating the memory module is no longer overheated, exiting (220) the thermal-aware execution state.

The method of FIG. 4 differs from the method of FIG. 2 in that in the method of FIG. 4, allocating (212) memory on a different memory module than the overheated memory module during thermal-aware execution is carried out by allocating (402) memory beginning at a virtual memory address a predefined size away from a previously utilized virtual memory address in the application's address space. Many operating systems are configured to allocate memory regions in a physically contiguous fashion; one memory region, followed by another, by another, with little to no free space in between. So, even in computing environments that operate with virtual addresses, the virtual addresses generally correspond to similar physical addresses. As such, an application (110) with some knowledge of the memory subsystem such as for example, knowledge of the size of each memory module may allocate memory on another memory module by requesting the operating system to allocate the memory at a virtual address, that if the virtual address maps directly to the same or nearly the same physical address would necessarily reference another memory module. Consider for example a memory subsystem composed of two, 1 GB DIMMs. Consider that the first DIMM is overheated, the application is executing in a thermal-aware state, and the most recent memory allocation carried out by the application begins at a virtual address that, if the same as a physical address, would reference a memory location 512 MB from the overheated memory module's initial memory address. Given close the typical nature of an operating system's virtual address to physical address mapping, the physical address that maps to virtual address of that memory region, although unknown to the application, is likely at or near the 512 MB from the memory module's initial memory address. As such, allocating (402) a memory region at a virtual memory address 1 GB from the previously utilized virtual memory address will in most cases result in memory allocation on a different memory module—again, relying on the typically close relationship of virtual to physical address mappings by the operating system. The example allocation (402) is a type of educated guess carried out by the application of a virtual address that maps to a physical address on another memory module.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of thermal-aware source code compilation, the method comprising:
   receiving, by a compiler during compilation of source code, an identification of a target computing system for which the source code is to be compiled, the identification of the target computing system specifying a plurality of temperature sensors, each temperature sensor configured to measure temperature of a memory module of the target computing system;
   compiling the source code into an executable application including inserting in the executable application computer program instructions for thermal-aware execution, the computer program instructions for thermal-aware execution, when executed on the target computing system, carry out the steps of:
      retrieving temperature measurements of one or more of the target computing system's temperature sensors, wherein retrieving temperature measurements of one or more of the target computing system's temperature sensors further comprises retrieving, periodically at an interval of a specified number of function calls, temperature measurements of one or more of the target computing system's temperature sensors; wherein the specified number of function calls is more than one;
      determining, in real-time in dependence upon the temperature measurements, whether a memory module is overheated;
      if a memory module is overheated, entering a thermal-aware execution state including, for each memory allocation in the executable application, allocating memory on a different memory module than the overheated memory module; and
      upon the temperature sensors indicating the memory module is no longer overheated, exiting the thermal-aware execution state.

2. The method of claim 1 wherein allocating memory on a different memory module other than the overheated memory module further comprises:
   requesting from an operating system of target computing system, a virtual address that maps to a physical memory address on a different memory module other than the overheated memory module; and
   utilizing the virtual address to allocate memory on the different memory module.

3. The method of claim 2 further comprising:
   storing in non-volatile memory of each memory module of the target system upon startup of the target system a physical memory address associated with the memory module; and
   responsive to the request for the virtual address that maps to a physical memory address on the different memory module, identifying, by the operating system, the physical memory address of the different memory module from the association stored in the different memory module's non-volatile memory.

4. The method of claim 1 wherein allocating memory on a different memory module other than the overheated memory module further comprises allocating memory beginning at a virtual memory address a predefined size away from a previously utilized virtual memory address in the application's address space.

5. The method of claim 1 wherein retrieving temperature measurements of one or more of the target computing system's temperature sensors further comprises retrieving, periodically at a predefined interval of time, temperature measurements of one or more of the target computing system's temperature sensors.

6. The method of claim 1 wherein each memory module comprises one of:
   a Dual In-Line Memory Module ('DIMM');
   a rank of a DIMM; and
   a Dynamic Random Access Memory ('DRAM') integrated circuit of a DIMM.

7. A method of thermal-aware execution of an application in a target computing system, the target computing system comprising a plurality of temperature sensors and a plurality of memory modules, each temperature sensor configured to measure temperature of a memory module of the target computing system, the method comprising:
   retrieving temperature measurements of one or more of the target computing system's temperature sensors, wherein retrieving temperature measurements of one or more of the target computing system's temperature sensors further comprises retrieving, periodically at an interval of a specified number of function calls, temperature measurements of one or more of the target computing system's temperature sensors; wherein the specified number of function calls is more than one;
   determining, in real-time in dependence upon the temperature measurements, whether a memory module is overheated;
   if a memory module is overheated, entering a thermal-aware execution state including, for each memory allocation in the executable application, allocating memory on a different memory module than the overheated memory module; and
   upon the temperature sensors indicating the memory module is no longer overheated, exiting the thermal-aware execution state.

* * * * *